E. B. Hall,
Stump Elevator.

N° 22,917.  Patented Feb. 8, 1859.

Witnesses.
Henry Howson
Henry Osborne

Inventor.
Ellis Berkley Hall

UNITED STATES PATENT OFFICE.

E. B. HALL, OF WOODBURY, NEW JERSEY, ASSIGNOR TO HIMSELF, AND JOS. C. FARLEY, OF PINE GROVE, NEW JERSEY.

STUMP-EXTRACTOR.

Specification of Letters Patent No. 22,917, dated February 8, 1859.

*To all whom it may concern:*

Be it known that I, E. B. HALL, of Woodbury, in the county of Gloucester and State of New Jersey, have invented a new and useful Improvement in Apparatus for Extracting Stumps; and I do hereby declare the following to be a full, clear, and exact description of the same, reference being had to the accompanying drawing and to the letters of reference marked thereon.

My invention relates to an improvement in the stump extractor, for which Letters Patent were granted to Jason S. Wood on the 3rd day of February, 1857; and my improvement consists in the combination of a cam of peculiar construction with two sliding rods, having rollers against which the cam operates, and two hooks, the whole of the parts being arranged, in respect to each other, substantially as described hereafter, so that a stump may be extracted by a continuous rotation of the single cam, instead of by a reciprocating motion of two cams, as in the aforesaid patent of J. S. Wood, thereby forming a more simple, light and portable instrument.

In order to enable others to make and use my invention, I will now proceed to describe its construction and operation.

Figure 1:
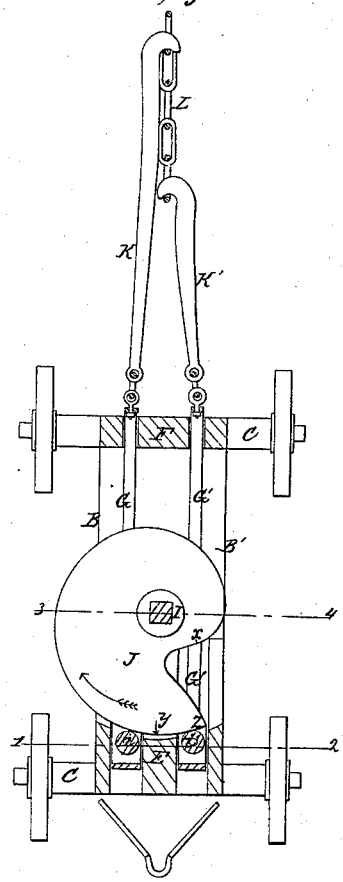
Figure 2:
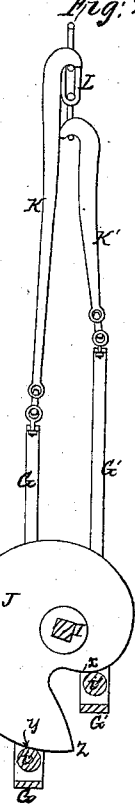
Figure 3:
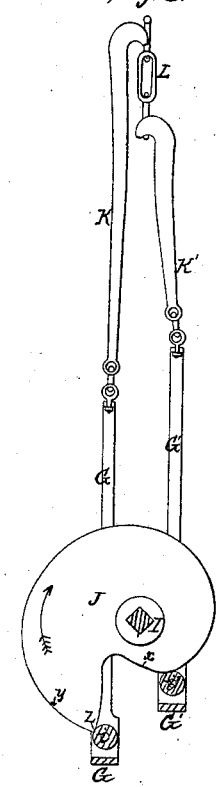
Figure 4:
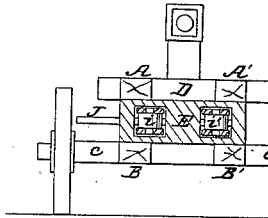
Figure 5:
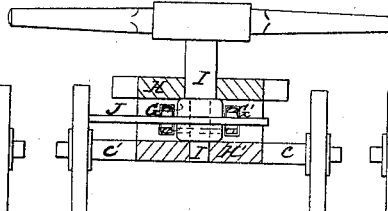
Figure 6:
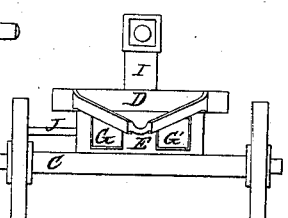

On reference to the accompanying drawing, which forms a part of this specification, Figure 1 is a plan view of my improved apparatus for extracting stumps; Figs. 2 and 3, plan views of the operating parts in different positions; Fig. 4, a sectional end view on the line 1, 2 (Fig. 1); Fig. 5, the same on the line 3, 4 (Fig. 1); Fig. 6, an end view.

Similar letters refer to similar parts throughout the several views.

The framework of the apparatus consists of the upper, longitudinal beams A and A' and the lower beams B and B', the ends of the latter being connected together by the axles C, and the ends of the former by the transverse beams D.

Between the upper and lower beams and at the rear of the machine, is secured a block E, in which are two openings for receiving and guiding the rear ends of the rods G and G', the front ends of the latter passing through and being guided by openings in a block F, secured between the upper and lower beams at the front end of the machine.

In transverse blocks secured to the longitudinal beams, about midway between the ends of the frames, turns the vertical shaft I, which is furnished at the top with ordinary capstan handles, or with attachments suitable for driving by horse power.

To the vertical shaft I, and between the upper and lower longitudinal beams, is secured a cam J, the edge of which bears against rollers $i$ and $i'$, the former being hung to a pin near the end of the rod G, and the latter to a pin near the end of the rod G'. The opposite ends of these rods are connected by links, the rod G to the hook K, and the rod G' to the hook K', the ends of the hooks being adapted to fit into the links of a chain L, which is secured to the stump to be extracted.

The front of the machine may be tied to standing trees or to a number of adjacent stumps, after the manner adopted in other machines of this class.

The framework is hung on wheels, so that the whole apparatus may be conveyed from place to place with facility.

It will be observed, that the cam wheel is of a peculiar form, the distance of its edge from the center of the shaft gradually increasing from the point $x$ to the point $y$. From the latter point to the abrupt termination at $z$, the edge gradually recedes to a slight extent toward the center. The object of this peculiarity will be apparent on describing the operation of the machine.

Supposing the cam, as it is turning in the direction of the arrow, to be in the position illustrated in Fig. 1, and the machine to be in the act of operating on a stump. It will be seen, that the edge of the cam near the point $y$ is bearing against the pulley $i$, while that portion of the edge of the cam, which, as before remarked, gradually recedes toward the center of the shaft, is bearing against the roller $i'$, in contact with which, the highest portion $y$ of the cam has recently traversed. The whole strain will, consequently, be on the rod G and hook K, while the rod G' and hook K' are released from the strain. When the cam has arrived at the position shown in Fig. 2, the roller $i'$ is released by the break in the cam at $z$, when the attendant pulls forward the rod G', and fits the hook K' into a link of the chain in advance of that which it previously fitted into, when the roller $i'$ takes its place at the point $x$ of the cam. It will now be apparent that, if the edge of the cam gradually increased in distance from the center of the shaft to the break at $z$, instead of decreasing from the point $y$ to the break, an excessive strain would be exerted on the rod G', up to the moment of its release, which would, consequently, take place suddenly and with a jar, injurious to the working parts of the machine and inconvenient to the operators. By the time the cam has arrived at the position illustrated in Fig. 3, the rod G is about to be released, having had the strain removed from it by the receding of the cam, and transferred to the rod G'. The rod G and hook K are now drawn forward, and the point of the latter fitted into another link of the chain L, in advance of that, into which it had previously fitted. It will now be seen without further description, that, as the cam is caused to revolve at a steady and uniform speed, an equally steady and uniform pulling force is exerted on the chain L, and on the stump to be extracted from the ground, and that no cessation of the movement of the cam or of the force exerted on the chain need take place, until the stump is extracted, or the whole of the chain expended, and that the release of the rods and removal of the hooks from one link to another, is effected without any jar to the machine or inconvenience to the operators.

I am aware that, in the stump extractor, for which Letters Patent were granted to Jason S. Wood on the 3rd February, 1857, cams, in conjunction with other appliances are used. I therefore do not claim broadly such a device, but

I claim as an improvement on the patent of J. S. Wood,

The cam J, when constructed in the peculiar manner herein described, in combination with the rods G and G', their respective rollers and hooks K and K', the whole of the above parts being arranged, in respect to each other for joint action, substantially as herein set forth.

In testimony whereof I have signed my name to this specification before two subscribing witnesses.

E. BENTLEY HALL.

Witnesses:
  HENRY HOWSON,
  CHARLES D. FREEMAN.